US012804696B2

(12) United States Patent
Singh et al.

(10) Patent No.: US 12,804,696 B2
(45) Date of Patent: Nov. 17, 2026

(54) COMMUNICATION DEVICE AND METHOD FOR HANDLING RESOURCE SELECTION

(71) Applicant: MediaTek Singapore Pte. Ltd., Singapore (SG)

(72) Inventors: Harshmeet Singh, Cambridge (GB); Miquel Eduard Oliver Cardona, Cambridge (GB); Jaakko Matias Viertola, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 5 days.

(21) Appl. No.: 18/744,716

(22) Filed: Jun. 17, 2024

(65) Prior Publication Data

US 2025/0386360 A1 Dec. 18, 2025

(51) Int. Cl.
*H04W 72/541* (2023.01)
*H04W 72/0446* (2023.01)

(52) U.S. Cl.
CPC ..... *H04W 72/541* (2023.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 2019/0191461 | A1* | 6/2019 | Lee | H04W 72/12 |
| 2023/0032706 | A1* | 2/2023 | Wu | H04W 72/23 |
| 2023/0292317 | A1* | 9/2023 | Nguyen | H04W 72/20 |
| 2023/0309065 | A1* | 9/2023 | Leon Calvo | H04W 72/563 |
| 2024/0080865 | A1* | 3/2024 | Ren | H04W 72/40 |
| 2024/0089993 | A1* | 3/2024 | Lee | H04W 72/1263 |

FOREIGN PATENT DOCUMENTS

WO 2018174661 A1 3/2018

* cited by examiner

*Primary Examiner* — Pao Sinkantarakorn
*Assistant Examiner* — Luis Guillermo Lema Lemos
(74) *Attorney, Agent, or Firm* — Winston Hsu

(57) ABSTRACT

An embodiment of the invention provides a communication device comprising at least one storage device and at least one processing circuit. The at least one storage device is configured to store instructions, and the at least one processing circuit is configured to execute the instructions to: store a subchannel list for a slot in a selection window or a future reception (RX) window, wherein the subchannel list comprises a RX reference signal received power (RSRP) and a bitmap; receive at least one sensing information for the slot from other communication device; and update the RX RSRP and the bitmap according to the at least one sensing information.

16 Claims, 6 Drawing Sheets

COMMUNICATION DEVICE AND METHOD FOR HANDLING RESOURCE SELECTION

BACKGROUND

Vehicle-to-everything (V2X) is a communication between a vehicle and any entity that may affect, or may be affected by, the vehicle. In Mode 2 (new radio (NR)-V2X) and Mode 4 (long-term evolution (LTE)-V2X) of V2X communication, V2X terminals can operate without any cellular infrastructure. In these modes of operations, the V2X terminals autonomously select resources (e.g., subchannels) from a pre-configured transmission (TX) resource pool using sensing information of preconfigured sensing period of the same TX resource pool. Whenever the resource selection is triggered by the higher layers, a low layer (e.g., Layer-1) of a V2X terminal processes the sensing information received in the last one second and uses this information, it determines unreserved resources and then it selects resource(s) from these unreserved resources, which can be used by the V2X terminal for the transmission. If the 3rd Generation Partnership Project (3GPP) steps are followed as is, the entire sensing information is processed at the time of a resource selection trigger and therefore the resource selection may consume significant amount of central processing unit (CPU) cycles and may lead to missing hard real time (HRT) timelines.

SUMMARY

It is an objective of the invention to provide a communication apparatus and a method for handling multi-cell scheduling, in order to solve the above problem.

An embodiment of the invention provides a communication device comprising at least one storage device and at least one processing circuit. The at least one storage device is configured to store instructions, and the at least one processing circuit is configured to execute the instructions to: store a subchannel list for a slot in a selection window or a future reception (RX) window, wherein the subchannel list comprises a RX reference signal received power (RSRP) and a bitmap; receive at least one sensing information for the slot from other communication device; and update the RX RSRP and the bitmap according to the at least one sensing information.

An embodiment of the invention provides a method for handling resource selection of a communication device comprising: storing a subchannel list for a slot in a selection window or a future reception (RX) window, wherein the subchannel list comprises a RX reference signal received power (RSRP) and a bitmap; receiving at least one sensing information for the slot from other communication device; and updating the RX RSRP and the bitmap according to the at least one sensing information.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
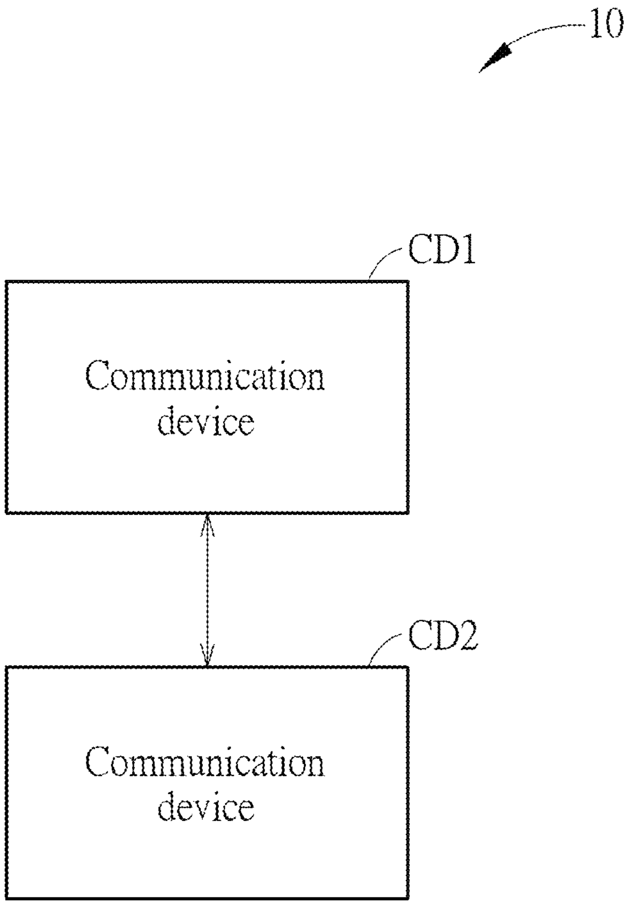
FIG. 1 is a schematic diagram of a communication system according to an embodiment of the invention.

FIG. 1 is a schematic diagram of a communication system 10 according to an embodiment of the invention. The communication system 10 is briefly composed of communication devices CD1 and CD2. In FIG. 1, the communication devices CD1 and CD2 are utilized for illustrating the structure of the communication system 10. For example, the communication system 10 may be any wireless communication system such as a wireless local area network (WLAN), a personal area network (PAN), a Long Term Evolution (LTE) system, a LTE-advanced (LTE-A) system or a 5th generation (5G) system (or evolved versions). The communication system 10 may comply with the standard of IEEE 802.11p, or the subsequent versions of this version.

The communication device CD1 (or the communication device CD2) may be a user equipment (UE), a device-to-device (D2D) communication device, an internet of things (IoT) device, a portable computer system, a vehicle, or combination thereof. The communication device CD2 (or the communication device CD1) may be a user equipment (UE), a station, a low cost device (e.g., machine type communication (MTC) device), a device-to-device (D2D) communication device, a narrow-band internet of things (IoT) (NB-IoT) device, a mobile phone, a laptop, a tablet computer, an electronic book, a portable computer system, a vehicle, an airplane, an infrastructure, or combination thereof.

Figure 2:
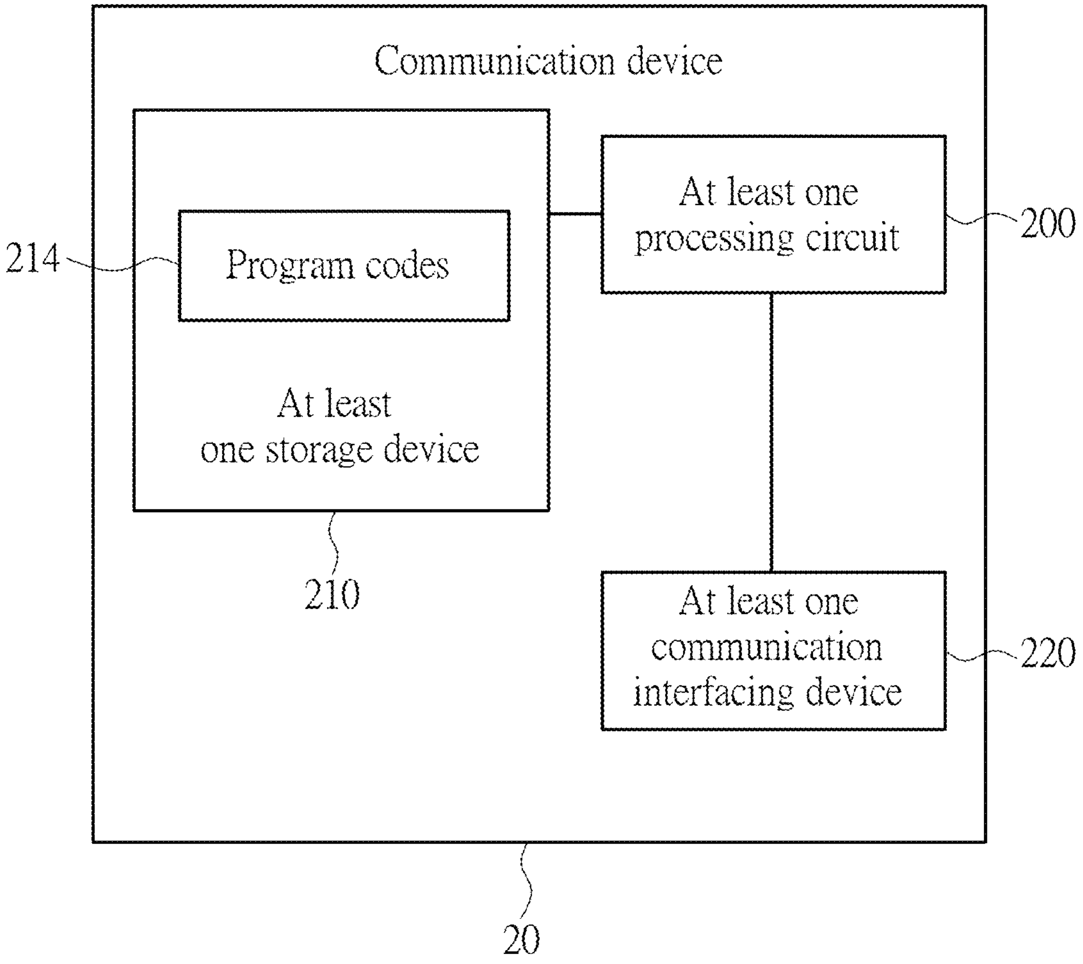
FIG. 2 is a schematic diagram of a communication device according to an embodiment of the invention.

FIG. 2 is a schematic diagram of a communication device 20 according to an embodiment of the invention. The communication device 20 may be a communication device CD1 or CD2 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include, but are not limited to, a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
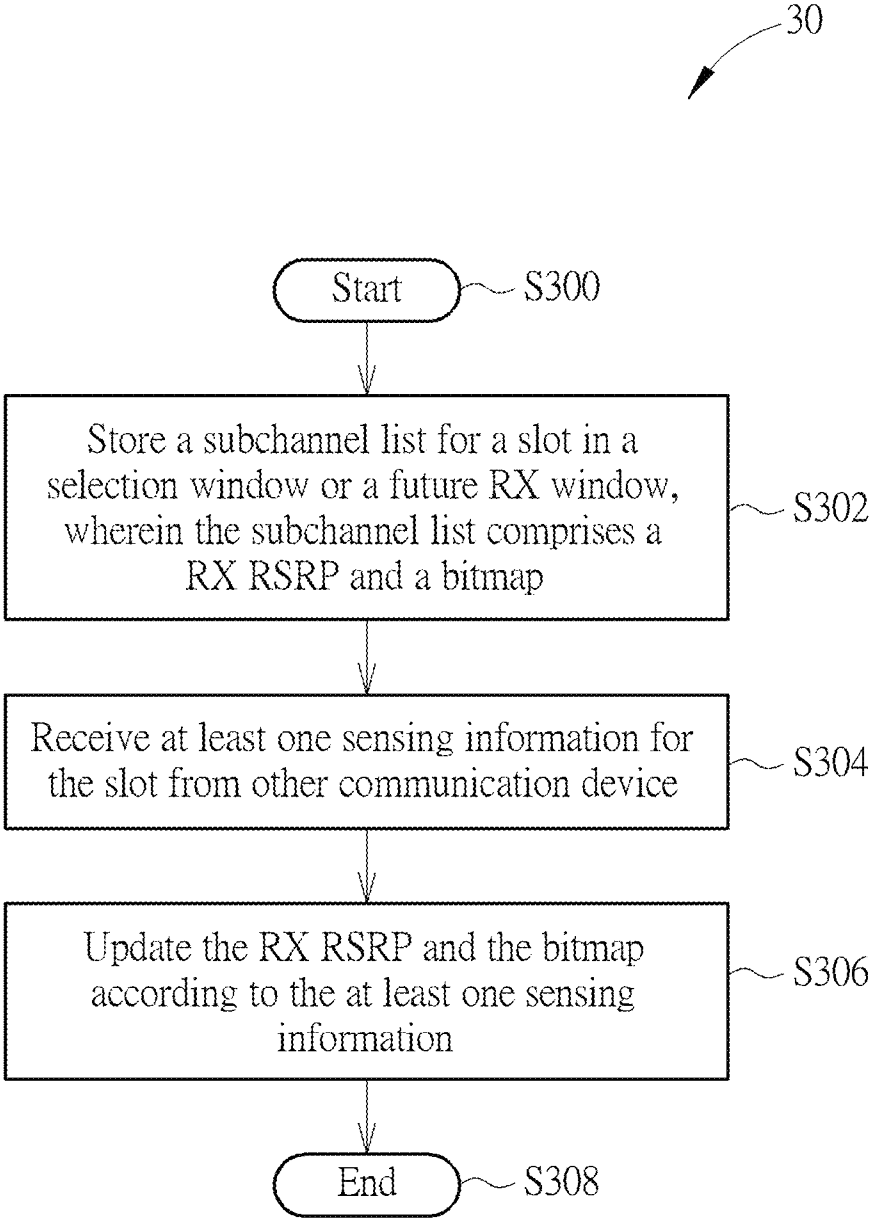
FIG. 3 is a flowchart of a process according to an embodiment of the invention.

FIG. 3 is a flowchart of a process 30 according to an embodiment of the invention. The process 30 may be utilized in a communication device (e.g., a communication device CD1 or CD2 in FIG. 1 or the communication device 20 in FIG. 2), to handling resource selection. The process 30 may be compiled into the program codes 214 and includes the following steps:

Step S300: Start.

Step S302: Store a subchannel list for a slot in a selection window or a future reception (RX) window, wherein the subchannel list comprises a RX reference signal received power (RSRP) and a bitmap.

Step S304: Receive at least one sensing information for the slot from other communication device.

Step S306: Update the RX RSRP and the bitmap according to the at least one sensing information.

Step S308: End.

In the process 30, the communication device processes (e.g., parses and stores) the at least one sensing information as and when received and maintains the at least one sensing information in a pre-sorted order of the RSRP of the subchannels. The communication device accordingly renews the RX RSRP and the bitmap according to the at least one sensing information to select resources (e.g., subchannels) for communications between the communication device and the other communication device.

Realization of the process 30 is not limited to the above description. The following embodiments of the invention may be applied to realize the process 30.

In an embodiment of the invention, the bitmap comprises a plurality of bits. In an embodiment of the invention, the plurality of bits corresponds to a plurality of subchannels for the communication device, respectively. In an embodiment of the invention, the bitmap indicates an availability of the plurality of subchannels for the slot. For example, a bit with "1" in the bitmap indicates that a subchannel corresponding to the bit is available. For example, a bit with "0" in the bitmap indicates that a subchannel corresponding to the bit is not available.

In an embodiment of the invention, the Step S306 comprises that the communication device generates a plurality of possible subchannel lists according to the at least one sensing information; traverses the plurality of possible subchannel lists to update the RX RSRP and the bitmap, until the RX RSRP is less than a first RSRP threshold; and avoids traversing the plurality of possible subchannel lists to update (or obtain) the bitmap corresponding to the Rx RSRP that is less than a second RSRP threshold by keeping (or using) a plurality of subchannel entry references to a plurality of entries corresponding to the Rx RSRP being less than the second RSRP threshold. In an embodiment of the invention, each of the plurality of possible subchannel lists comprises a possible bitmap and a possible RX RSRP. In an embodiment of the invention, the plurality of possible subchannel lists with a descending order of a plurality of possible RX RSRPs are sorted. In an embodiment of the invention, the plurality of possible RX RSRPs are greater than the first RSRP threshold. In an embodiment of the invention, the communication device traverses subchannel lists for periodic slots, until the RX RSRP is less than the first RSRP threshold, if a resource reservation interval (RRI) for transmission is not equal to 0 (i.e., the transmission is a periodic transmission).

In an embodiment of the invention, the first RSRP threshold is stored as part of each entry in a subchannel list, and corresponds to a RSRP value associated to the at least one sensing information for that entry. In an embodiment of the invention, the first RSRP threshold is compared to against the RSRP value associated to the at least one sensing information whose entry is being created for the purpose of inserting the entry into the subchannel list in a sorted manner from high to low RSRP. In an embodiment of the invention, the second threshold is for determining a maximum level of interference that is accepted before the resource is considered unavailable. In an embodiment of the invention, the second threshold is set to a lowest pre-defined value (e.g., −130 dB). If less than a part (e.g., 20%) of resources in the selection window are found to be available by using the second threshold with the lowest pre-defined value, the second threshold is increased via 3 dB iterations until more than the part (e.g., 20%) of resources in the selection window are available.

In an embodiment of the invention, a size of the selection window is determined according to at least one of a maximum packet delay budget (PDB) and at least one period parameter. In an embodiment of the invention, the at least one period parameter comprises at least one of period parameters Tproc,0, Tproc,1, T0, T1 and T2. These period parameters are defined in the 3rd Generation Partnership Project (3GPP) standard. The period parameters T0 and Tproc,0 are for determining start and end of the sensing window. The period parameters Tproc,1, T1 and T2 are for determining start and end of the selection window. For example, the resource selection is triggered at a slot n or the communication device receives the at least one sensing information at the slot n. Accordingly, the sensing window comprises slots within [n−T0, n−Tproc,0] duration, and the selection window comprises slots within [n+T1, n+T2] duration where 0≤T1≤Tproc,1. In an embodiment of the invention, a size of the future RX window is determined according to a maximum of an RRI (e.g., 1 second) for transmission.

In an embodiment of the invention, the slot is not more than the maximum of the RRI away from the other slot for the communication device to receive the at least one sensing information. The slot may fall in the selection window or beyond the selection window. A plurality of candidate slots for the slot beyond the selection window are termed as the future RX window. In an embodiment of the invention, the slot is determined according to RRI information in the at least one sensing information.

In an embodiment of the invention, the communication device determines a parameter (e.g., parameter Q) corresponding to a variable (e.g., q value) for the selection window and the future RX window. In an embodiment of the invention, the communication device determines the slot in the selection window and inserts at least one possible subchannel list into the slot in the selection window, in response to the parameter greater than 1. In an embodiment of the invention, the communication device determines the slot in the future RX window and inserts a possible subchannel list into the slot in the future RX window, in response to the parameter equal to 1.

In an embodiment of the invention, the variable and the parameter are integers, and the variable is not greater than the parameter. In an embodiment of the invention, the future RX window is adjacent to the selection window. In an embodiment of the invention, the at least one sensing information may be sidelink control information (SCI) (e.g., SCI-1A), but is not limited herein.

In an embodiment of the invention, the at least one sensing information indicates a resource reservation of at least one first subchannel within the plurality of subchannels, and indicates at least one possible RX RSRP. In an embodiment of the invention, the communication device selects at least one second subchannel within the at least one first subchannel for the slot to perform transmission. The at least one first subchannel is available and indicated by the subchannel list. In an embodiment of the invention, the at least one sensing information comprises information about at least one third subchannel within the plurality of subchannels reserved by the other communication device which the other communication device would use in the slot.

In an embodiment of the invention, the communication device slides the selection window and the future RX window by one slot, e.g., in response to new sensing information being received. That is, a very first slot of the future RX window is moved into the selection window. In an embodiment of the invention, the communication device clears the at least one sensing information for the slot. In an embodiment of the invention, the communication device may be a V2X UE, but is not limited herein. In an embodiment of the invention, the communication device slides the sensing window by one slot, e.g., in response to the new sensing information being received. That is, the selection window, the future RX window and the sensing window may be slid simultaneously.

Figure 4:
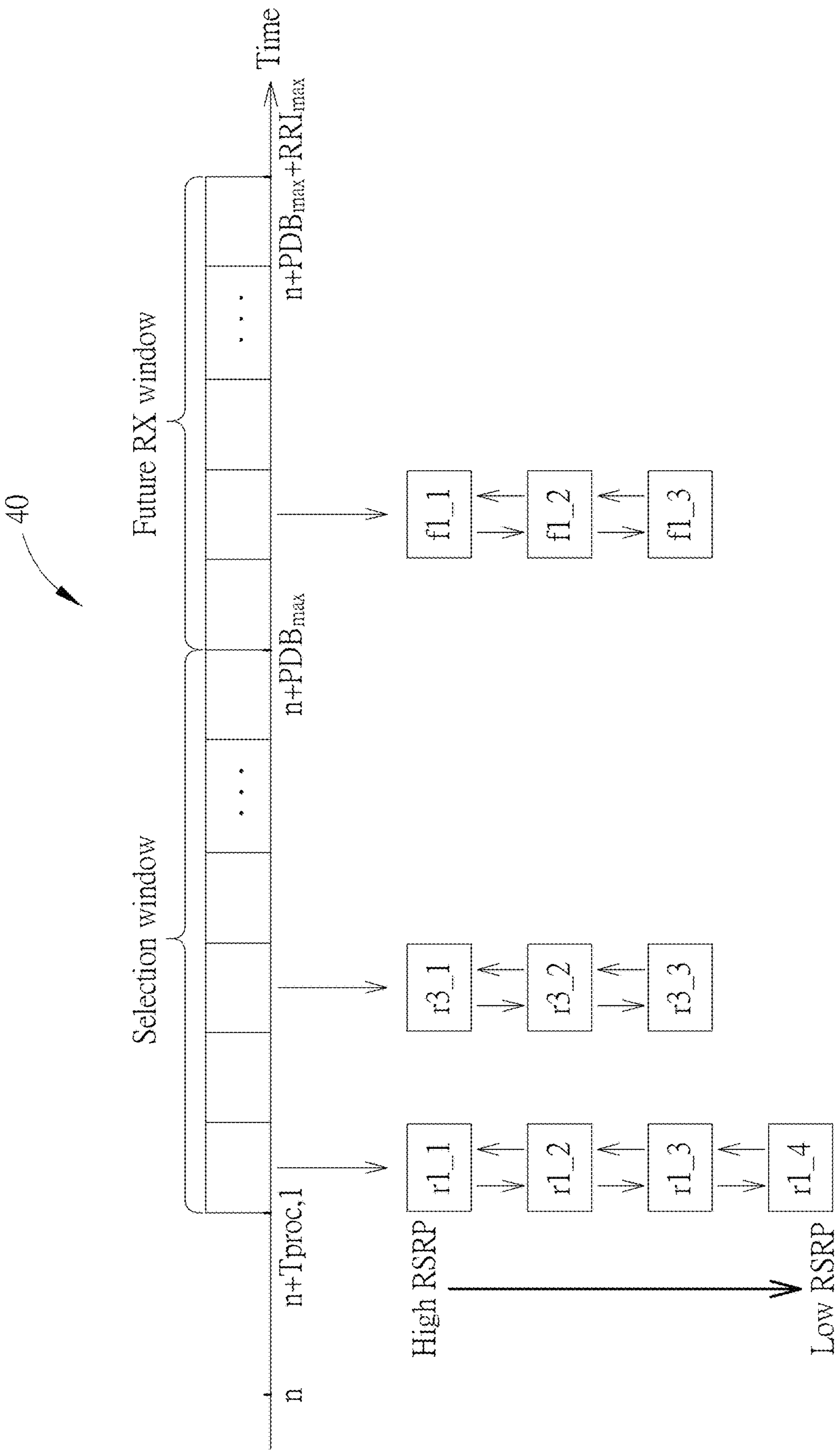
FIG. 4 is a schematic diagram of a scenario according to an embodiment of the invention.

FIG. 4 is a schematic diagram of a scenario 40 according to an embodiment of the invention. In FIG. 4, a horizontal axis represents time (e.g., slot). A resource selection is triggered at a time n. A selection window comprises slots within [n+Tproc,1, n+$PDB_{max}$] duration, and a future RX window comprises slots within [n+$PDB_{max}$, n+$PDB_{max}$+$RRI_{max}$] duration. A subchannel list for each slot in the selection window and the future RX window is determined by sensing information. There is at least one possible subchannel list for each slot. Each element in the subchannel list may be termed as node or entry. Each possible subchannel list comprises a possible RX RSRP and a possible bitmap. The possible bitmap indicates availability of subchannels for the corresponding slot. The double sided arrows between two neighboring possible subchannel lists represent doubly linked list. The possible subchannel lists can be traversed in both directions. In FIG. 4, the first slot and the third slot in the selection window and the second slot in the future RX window are taken for examples. The possible subchannel lists for other slots in the selection window and the future RX window are not shown in FIG. 4 and not narrated herein for brevity.

For the first slot in the selection window, there are four possible subchannel lists r1_1-r1_4 with a descending order of possible RX RSRPs (high to low). The communication device traverses the possible subchannel lists r1_1-r1_4 for the first slot in the selection window, until the current RX RSRP is less than a RSRP threshold (e.g., the first RSRP threshold). For the third slot in the selection window, there are three possible subchannel lists r3_1-r3_3 with a descending order of possible RX RSRPs (high to low). The communication device traverses the possible subchannel lists r3_1-r3_3 for the third slot in the selection window, until the current RX RSRP is less than a RSRP threshold (e.g., the first RSRP threshold). For the second slot in the future RX window, there are three possible subchannel lists f2_1-f2_3 with a descending order of possible RX RSRPs (high to low). The communication device traverses the possible subchannel lists f2_1-f2_3 for the second slot in the future RX window, until the current RX RSRP is less than a RSRP threshold (e.g., the first RSRP threshold).

Figure 5:
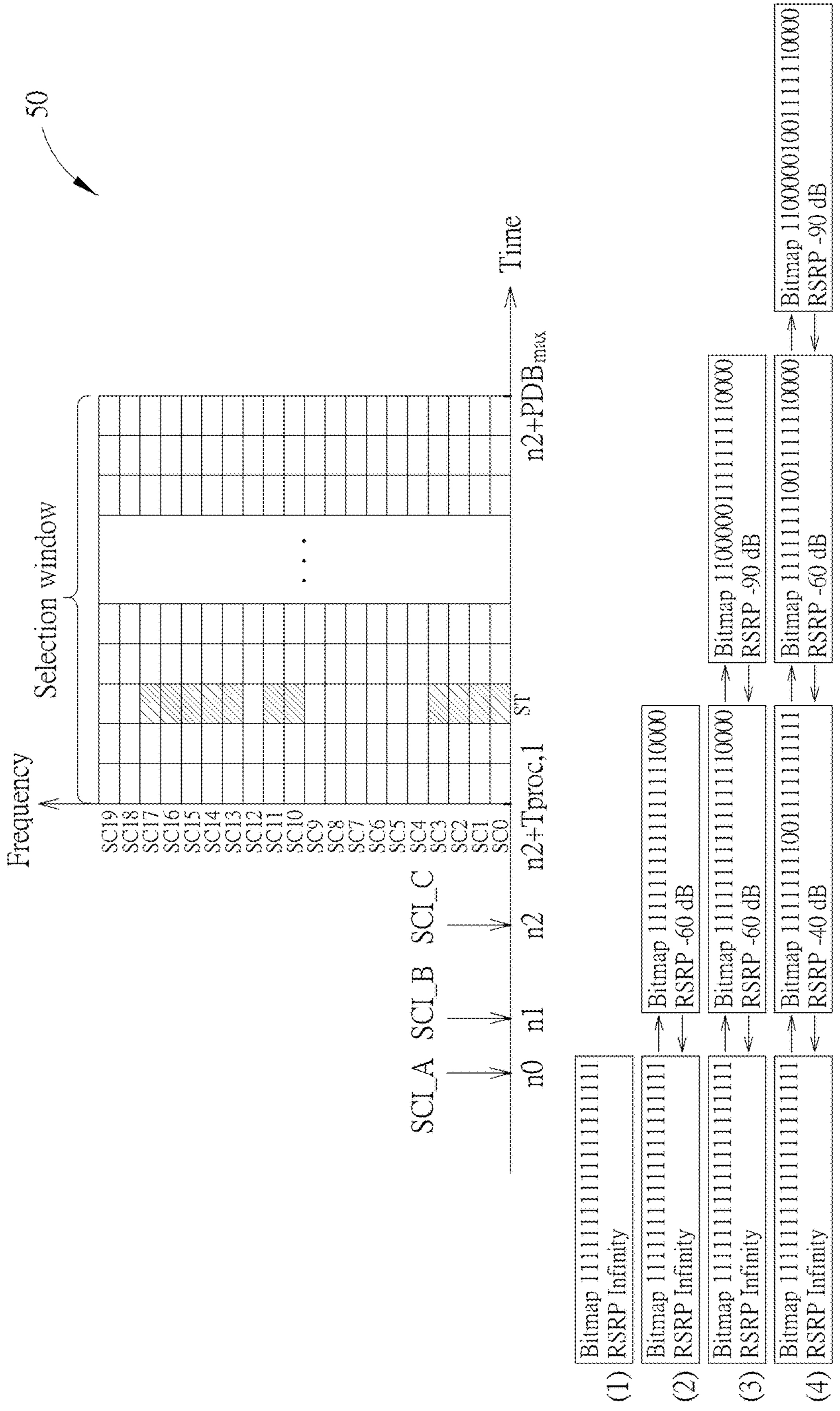
FIG. 5 is a schematic diagram of a scenario according to an embodiment of the invention.

FIG. 5 is a schematic diagram of a scenario 50 according to an embodiment of the invention. In FIG. 5, a horizontal axis represents time (e.g., slot) and a vertical axis represents frequency (e.g., subchannel). The communication device receives SCIs SCI_A, SCI_B and SCI_C for a slot ST at times n0, n1 and n2, respectively. A selection window comprises slots within [n2+Tproc,1, n2+$PDB_{max}$] duration. There are 20 subchannels SC0-SC19 for each slot in the selection window. The SCI SCI_A indicates a resource reservation of the subchannels SC0-SC3 and a RSRP with −60 decibel (dB). The SCI SCI_B indicates a resource reservation of the subchannels SC13-SC17 and a RSRP with −90 dB. The SCI SCI_C indicates a resource reservation of the subchannels SC10-SC11 and a RSRP with −40 dB. The subchannels SC0-SC3, SC10-SC11 and SC13-SC17 for the slot ST are shown as slash areas in FIG. 5.

In the beginning (i.e., before receiving the SCIs SCI_A, SCI_B and SCI_C), a subchannel list for the slot ST is considered according to an option (1). In the option (1), the subchannel list comprises a bitmap with twenty bits with "1" and an infinite RSRP. A bit with "1" indicates that a subchannel corresponding to the bit is available.

When receiving the SCI SCI_A for the slot ST, the subchannel list for the slot ST is considered according to an option (2). In the option (2), there are two possible subchannel lists. The first possible subchannel list in the option (2) is the same as that in the option (1). In the second possible subchannel list in the option (2), the bitmap indicates that the subchannels SC0-SC3 are not available (a bit with "0" indicates that a subchannel corresponding to the bit is not available) and the RSRP is −60 dB, in response to the resource reservation and the RSRP indicated by the SCI SCI_A. Therefore, the communication device traverses the possible subchannel lists in the option (2).

When receiving the SCI SCI_B for the slot ST, the subchannel list for the slot ST is considered according to an option (3). In the option (3), there are three possible subchannel lists. The first and second possible subchannel lists in the option (3) is the same as that in the option (2). In the third possible subchannel list in the option (3), the bitmap indicates that the subchannels SC0-SC3 and SC13-SC17 are not available, in response to the resource reservations indicated by the SCIs SCI_A and SCI_B, and indicates that the RSRP is −90 dB, in response to the RSRP indicated by the SCI SCI_B. Therefore, the communication device traverses the possible subchannel lists in the option (3).

When receiving the SCI SCI_C for the slot ST, the subchannel list for the slot ST is considered according to an option (4). In the option (4), there are four possible subchannel lists. The first possible subchannel list in the option (4) is the same as that in the option (1). According to a descending order of RSRPs, the SCI SCI_C is considered first. In the second possible subchannel list in the option (4), the bitmap indicates that the subchannels SC10-SC11 are not available and the RSRP is −40 dB, in response to the resource reservation and the RSRP indicated by the SCI SCI_C. Then, the SCIs SCI_A and SCI_C are considered. In the third possible subchannel list in the option (4), the bitmap indicates that the subchannels SC0-SC3 and SC10-SC11 are not available, in response to the resource reservations indicated by the SCIs SCI_A and SCI_C, and indicates that the RSRP is −60 dB, in response to the RSRP indicated by the SCI SCI_A. Finally, the SCIs SCI_A, SCI_B and SCI_C are considered. In the fourth possible subchannel list in the option (4), the bitmap indicates that the subchannels SC0-SC3, SC10-SC11 and SC13-SC17 are not available, in response to the resource reservations indicated by the SCIs SCI_A, SCI_B and SCI_C, and indicates that the RSRP is −90 dB, in response to the RSRP indicated by the SCI SCI_B. Therefore, the communication device traverses the possible subchannel lists in the option (4).

Figure 6:
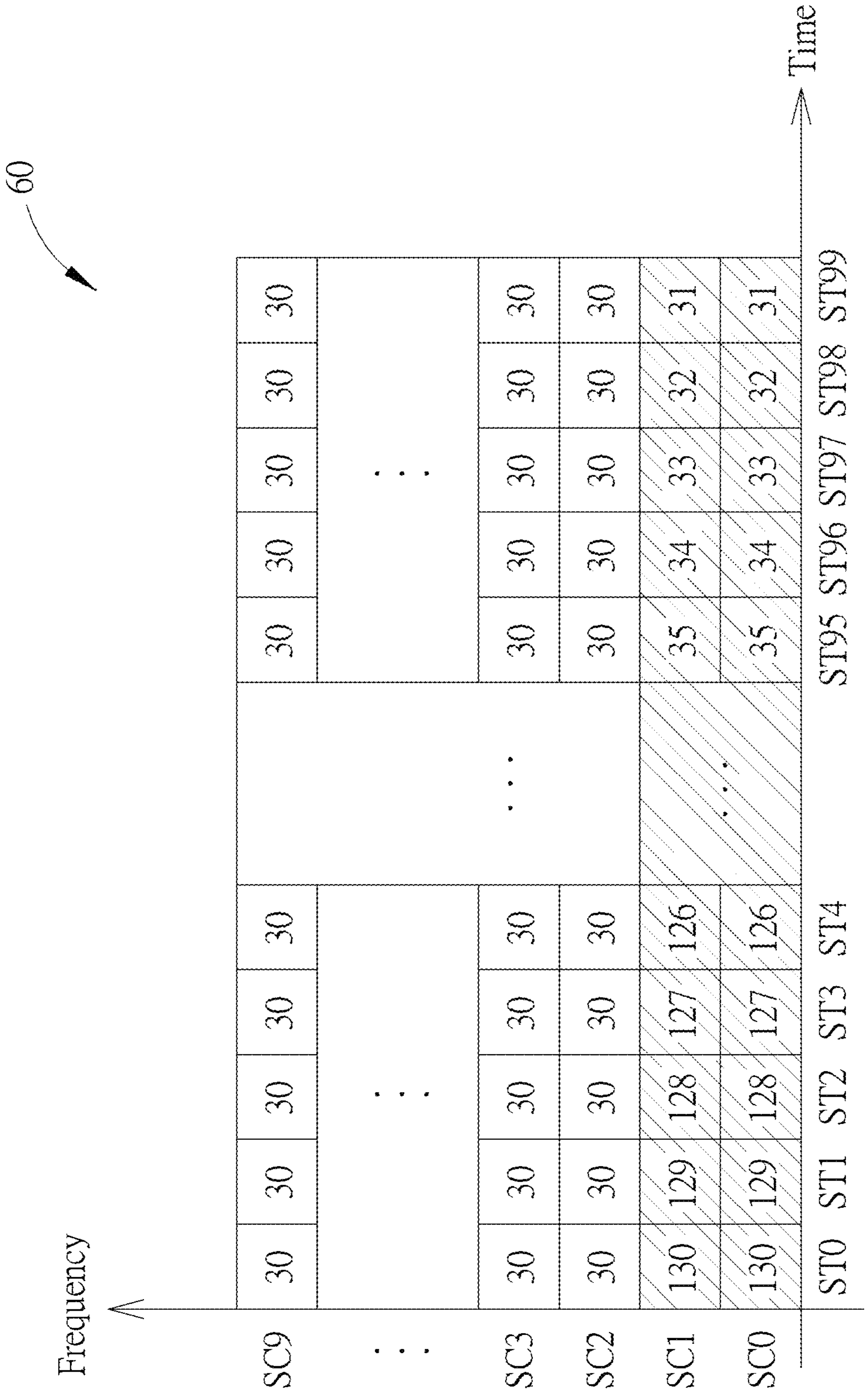
FIG. 6 is a schematic diagram of a test according to an embodiment of the invention.

FIG. 6 is a schematic diagram of a test 60 according to an embodiment of the invention. In FIG. 6, a horizontal axis represents time (e.g., slot) and a vertical axis represents frequency (e.g., subchannel). There are 10 subchannels SC0-SC9 and 100 slots ST0-ST99. A communication device under the test 60 is requested to perform a transmission and a previous transmission at least 1 second apart. The communication device needs to perform 3 dB iterations (e.g., 34 times) to select top 20% candidate single-subframe resources (CSRs). The 3 dB iterations are defined in the 3GPP standard, and not narrated herein for brevity. A value in each block represents a RSRP value (dB) for transmission. The top 20% CSRs are shown as a slash area in FIG. 6. The test 60 is executed several times (e.g., 1000 times), and a time difference between a transmission trigger time and an actual transmission time for each block is checked. If the time difference between the transmission trigger time and the actual transmission time is equal to or smaller than a period parameter Tproc,1, the communication device under the test 60 is not affected by a resource allocation algorithm (e.g., the process 30) taking a long time when the communication device needs to perform 3 dB iterations.

To sum up, the invention provides a communication device and a method for handling resource selection. The communication device autonomously selects resource(s) (e.g., slot(s) and/or subchannel (s)) for transmission according to the possible subchannel lists sorted based on the possible RX RSRPs. The communication device need not perform an entire resource selection scheme in the prior art, and easily eliminates overlapping subchannels according to the possible RX RSRPs in the possible subchannel lists. The communication device easily checks whether the reserved resource are taken by other communication device according to the sorted possible subchannel lists. If not, the communication device can avoid performing the resource selection for re-evaluation/pre-emption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling resource selection, comprising:
- at least one storage device; and
- at least one processing circuit, coupled to the at least one storage device, wherein the at least one storage device is configured to store instructions, and the at least one processing circuit is configured to execute the instructions to:
  - store a subchannel list for a slot in a selection window or a future reception (RX) window, wherein the subchannel list comprises a RX reference signal received power (RSRP) and a bitmap;
  - receive at least one sensing information for the slot from other communication device; and
  - update the RX RSRP and the bitmap according to the at least one sensing information;
  - wherein the instruction of updating the RX RSRP and the bitmap according to the at least one sensing information comprises:
    - generate a plurality of possible subchannel lists according to the at least one sensing information;
    - traverse the plurality of possible subchannel lists to update the RX RSRP and the bitmap, until the RX RSRP is less than a first RSRP threshold; and
    - avoid traversing the plurality of possible subchannel lists to update the bitmap corresponding to the Rx RSRP that is less than a second RSRP threshold by keeping a plurality of subchannel entry references to a plurality of entries corresponding to the Rx RSRP being less than the second RSRP threshold;
  - wherein each of the plurality of possible subchannel lists comprises a possible bitmap and a possible RX RSRP.

2. The communication device of claim 1, wherein the bitmap comprises a plurality of bits, and the plurality of bits corresponds to a plurality of subchannels for the communication device, respectively.

3. The communication device of claim 1, wherein the bitmap indicates an availability of a plurality of subchannels for the slot.

4. The communication device of claim 1, wherein a size of the selection window is determined according to at least one of a maximum packet delay budget (PDB) and at least one period parameter.

5. The communication device of claim 1, wherein a size of the future RX window is determined according to a maximum of a resource reservation interval (RRI) for transmission.

6. The communication device of claim 1, wherein the at least one processing circuit is configured further to execute the instructions to:
- determine a parameter corresponding to a variable for the selection window and the future RX window;
- determine the slot in the selection window and inserting at least one possible subchannel list into the slot in the selection window, in response to the parameter greater than 1; and
- determine the slot in the future RX window and inserting a possible subchannel list into the slot in the future RX window, in response to the parameter equal to 1.

7. The communication device of claim 6, wherein the variable and the parameter are integers, and the variable is not greater than the parameter.

8. The communication device of claim 1, wherein the future RX window is adjacent to the selection window.

9. The communication device of claim 1, wherein the at least one processing circuit is configured further to execute the instructions to:
- slide the selection window and the future RX window by one slot; and
- clear the at least one sensing information for the slot.

10. A method for handling resource selection of a communication device, comprising:
- storing a subchannel list for a slot in a selection window or a future reception (RX) window, wherein the subchannel list comprises a RX reference signal received power (RSRP) and a bitmap;
- receiving at least one sensing information for the slot from other communication device; and
- updating the RX RSRP and the bitmap according to the at least one sensing information;

wherein the step of updating the RX RSRP and the bitmap according to the at least one sensing information comprises:

generating a plurality of possible subchannel lists according to the at least one sensing information;

traversing the plurality of possible subchannel lists to update the RX RSRP and the bitmap, until the RX RSRP is less than a first RSRP threshold; and avoiding traversing the plurality of possible subchannel lists to update the bitmap corresponding to the Rx RSRP that is less than a second RSRP threshold by keeping a plurality of subchannel entry references to a plurality of entries corresponding to the Rx RSRP being less than the second RSRP threshold;

wherein each of the plurality of possible subchannel lists comprises a possible bitmap and a possible RX RSRP.

11. The method of claim 10, wherein the bitmap comprises a plurality of bits, and the plurality of bits corresponds to a plurality of subchannels for the communication device, respectively.

12. The method of claim 10, wherein the bitmap indicates an availability of a plurality of subchannels for the slot.

13. The method of claim 10, further comprising:

determining a parameter corresponding to a variable for the selection window and the future RX window;

determining the slot in the selection window and inserting at least one possible subchannel list into the slot in the selection window, in response to the parameter greater than 1; and determining the slot in the future RX window and inserting a possible subchannel list into the slot in the future RX window, in response to the parameter equal to 1.

14. The method of claim 13, wherein the variable and the parameter are integers, and the variable is not greater than the parameter.

15. The method of claim 10, wherein the future RX window is adjacent to the selection window.

16. The method of claim 10, further comprising:

sliding the selection window and the future RX window by one slot; and clearing the at least one sensing information for the slot.

* * * * *